United States Patent
Walsh et al.

(10) Patent No.: US 10,125,879 B2
(45) Date of Patent: Nov. 13, 2018

(54) POOL FILTER SYSTEMS INCLUDING POOL FITTINGS

(75) Inventors: Sean Walsh, Westhampton, NY (US); James Patrick Mulhern, Nanticoke, PA (US)

(73) Assignee: Eco-Blu Pool Components LLC, Forty Fort, PA (US)

( * ) Notice: Subject to any disclaimer, the term of this patent is extended or adjusted under 35 U.S.C. 154(b) by 420 days.

(21) Appl. No.: 14/236,730

(22) PCT Filed: Aug. 3, 2012

(86) PCT No.: PCT/US2012/049416
§ 371 (c)(1),
(2), (4) Date: May 5, 2014

(87) PCT Pub. No.: WO2013/020006
PCT Pub. Date: Feb. 7, 2013

(65) Prior Publication Data
US 2014/0331398 A1   Nov. 13, 2014

Related U.S. Application Data

(63) Continuation of application No. 13/197,426, filed on Aug. 3, 2011, now Pat. No. 9,267,299.

(60) Provisional application No. 61/607,644, filed on Mar. 7, 2012.

(51) Int. Cl.
*F16K 15/14* (2006.01)
*E04H 4/12* (2006.01)
*E04H 4/16* (2006.01)

(52) U.S. Cl.
CPC ......... *F16K 15/147* (2013.01); *E04H 4/1209* (2013.01); *E04H 4/169* (2013.01)

(58) Field of Classification Search
CPC ..... F16K 15/147; E04H 4/1209; E04H 4/169; B05B 3/02
USPC .......................................................... 137/849
See application file for complete search history.

(56) References Cited

U.S. PATENT DOCUMENTS

| | | |
|---|---|---|
| 2,822,819 A | 2/1958 | Geeraert |
| 3,895,646 A | 7/1975 | Howat |
| 4,188,673 A | 2/1980 | Carter |
| 4,393,526 A | 7/1983 | Miller et al. |
| 5,245,714 A | 9/1993 | Haraga et al. |
| 5,265,286 A | 11/1993 | Filipponi |

(Continued)

OTHER PUBLICATIONS

MrAllSurface "The Miracle Circulator Pool Jet Return" video Oct. 27, 2009. http://www.youtube.com/watch?v=v2omwnVejx0.*

(Continued)

*Primary Examiner* — Janie Loeppke
(74) *Attorney, Agent, or Firm* — Baker & Hostetler LLP

(57) ABSTRACT

Disclosed is a pool jet fitting configured to direct flow of water in a closed loop pool pumping filtration system. The pool jet fitting may include a housing and a valve positioned in the housing. The housing may include a housing body that defines a bore that extends through the housing body. The valve may be positioned in the bore of the housing and may be configured to receive water flow from a water pump. The valve may define an adjustable opening having a dimension capable of automatically adjusting between a first dimension and a second dimension to facilitate a predetermined outflow velocity of the water received from the pump.

11 Claims, 18 Drawing Sheets

(56) References Cited

U.S. PATENT DOCUMENTS

| | | | |
|---|---|---|---|
| 5,340,291 A * | 8/1994 | Benckert | F04B 15/02 |
| | | | 137/515 |
| 5,495,627 A | 3/1996 | Leaverton et al. | |
| 7,237,619 B2 * | 7/2007 | Mehr | A62C 31/02 |
| | | | 137/849 |
| 7,445,028 B1 | 11/2008 | Aanonsen et al. | |
| 7,571,496 B2 | 8/2009 | Martin | |
| 7,874,808 B2 | 1/2011 | Stiles | |
| 8,322,908 B1 | 12/2012 | Hartmann | |
| 2013/0061383 A1 | 3/2013 | Hartmann et al. | |

OTHER PUBLICATIONS

Http//www.infusionpool.com/Product; 2 pages, 2011, Oct. 28, 2011.

* cited by examiner

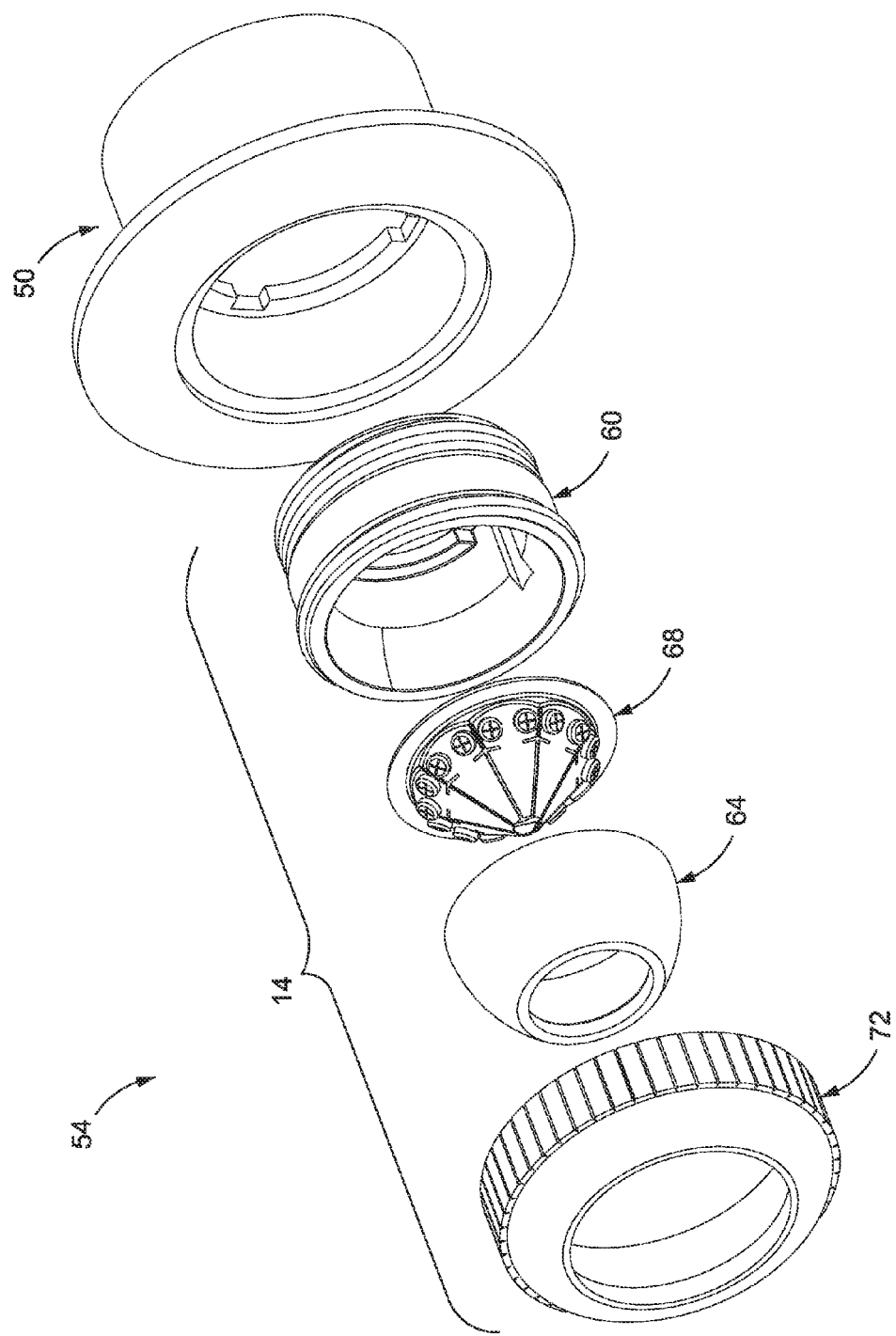

POOL FILTER SYSTEMS INCLUDING POOL FITTINGS

This application is the National Stage of International Application No. PCT/US2012/049416, filed Aug. 3, 2012, which claims benefit of U.S. application Ser. No. 13/197,426 filed Aug. 3, 2011 and U.S. Provisional Application No. 61/607,644 filed Mar. 7, 2012, the disclosures of which are incorporated herein by reference in their entireties. For ministerial reasons, the ADS states that this application claims the benefit of U.S. Provisional Application No. 61/607,644 and is a continuation of U.S. application Ser. No. 13/197,426.

BACKGROUND

Swimming pools include pool filter systems that circulate the pool water so as to remove debris, and to prevent algae outbreaks and pH swings. Typically pool filter systems include a pool pump that draws the pool water from the pool through a drain/filter and back to the pool through a plurality of returns. Many returns take the form of jet fittings, some of which have a rotatable eyeball that directs the return flow of the pool water in a desired direction, such as toward the surface of the pool, and others are configured to pop-up from a wall of the pool, such as the floor or side wall so as to direct debris toward the drain, and/or to keep the debris in suspension so that it can be filtered out. The pool jet fittings that are configured to direct water toward the surface of the pool create surface agitation to thereby force debris on the surface of the pool to the filter, and to create an audible sound that is desired by the pool owner.

Pool pumps typically are operated several hours of the day at high speeds, and consume a large amount of energy. The energy consumption involved during such usage can account for a major portion of a home owner's energy costs. To address this problem, variable speed water pumps have been introduced that can operate at low speeds. When operating at low speeds, however, the pool jet fittings do not perform their functions adequately.

SUMMARY

In one embodiment a pool jet fitting may be configured to direct flow of water in a closed loop pool pumping filtration system. The pool jet fitting can include a housing having a housing body and a bore that extends through the housing body, the bore configured to receive water flow from a water pump. The pool jet fitting can further include a valve positioned in the bore of the housing. The valve can define an adjustable opening defining a dimension that is capable of automatically adjusting between a first dimension and a second dimension to facilitate a predetermined outflow velocity of the water received from the pump. The pool jet fitting can be configured to have a rotatable insert or to have a pop-up housing.

In another embodiment the pool jet fitting may include a housing and a valve positioned in the housing. The housing may include a housing body that defines a bore that extends through the housing body. The housing body may be configured to mate with a pre-existing wall mount, and the bore may be configured to receive water flow from a variable flow water pump that is capable of pumping the water flow at different flow rates. The valve may be positioned in the bore of the housing, and may define an adjustable opening that is configured to maintain an outflow velocity of the water that agitates the surface of a pool as the flow rate of the water flow from the variable speed water pump changes.

In another embodiment, the pool jet fitting includes a housing and a valve. The housing includes a housing body and a bore that extends through the housing body. The housing body includes a coupler that is configured to mate with a coupler of a wall mount so as to releasably couple the housing to the wall mount. The bore is configured to receive water flow from a water pump. The valve is positioned in the bore of the housing. The valve has at least one slit that defines at least two flexible members that are configured to flex outwardly so as to facilitate a predetermined outflow velocity of the water received from the water pump.

In another embodiment a pool filter system may be configured to promote surface agitation of a pool. The pool filter system may include a variable speed water pump, a plurality of pool jet fittings, a pool drain, and piping. The water pump may be configured to pump water at least at a first flow rate and a second flow rate that is greater than the first flow rate. The variable speed water pump may have a pump inlet and a pump outlet. Each one of the plurality of pool jet fittings may include a valve that defines an adjustable opening that automatically adjusts in response to a change in pump output from the second flow rate to the first flow rate to facilitate an outflow velocity of the water from the pool jet fitting to promote surface agitation of a pool. The piping may connect the pool drain to the pump inlet and may connect the pump outlet to the pool jet fittings.

BRIEF DESCRIPTION OF THE DRAWINGS

The foregoing summary, as well as the following detailed description of preferred embodiments of the application, will be better understood when read in conjunction with the appended drawings. For the purposes of illustrating the pool filter systems and pool jet fittings of the present application, there is shown in the drawings preferred embodiments. It should be understood, however, that the application is not limited to the precise arrangements and instrumentalities shown. In the drawings:

FIG. 2B is a perspective exploded view of the pool jet fitting and wall mount shown in FIG. 2A, the pool jet fitting including a valve, a housing, a rotatable insert, and a cap;

DETAILED DESCRIPTION

Figure 1A:
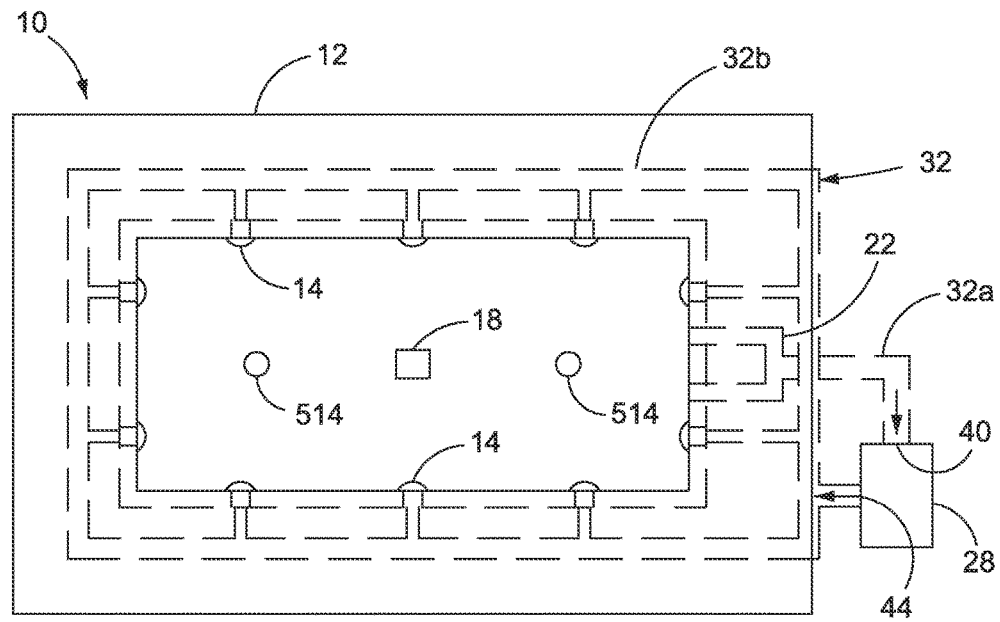
FIG. 1A is a schematic of a pool filter system including a pump, and a plurality of pool jet fittings that are configured to receive water from the pump and direct the water into the pool so as to aid in cleaning the pool.
Figure 1B:
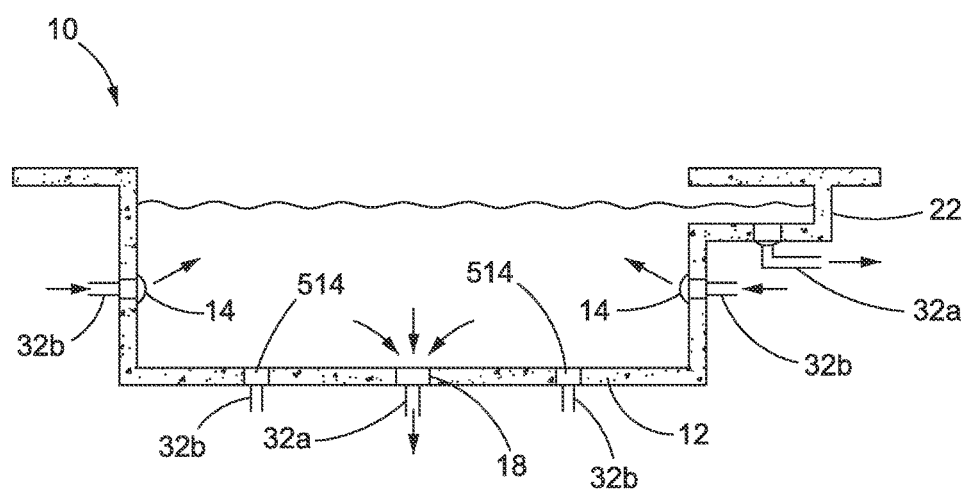
FIG. 1B is a schematic showing the flow of water through the pool filter system shown in FIG. 1A.

Referring to FIGS. 1A and 1B, a pool filter system 10 is configured to filter water of a pool 12 in an efficient and economical manner while at the same time maintaining the desired return velocity of the water as the filtered water is returned to the pool. The pool filter system 10 includes a plurality of pool jet fittings 14 (and/or 514) mounted to at least one, such as four side walls of the pool 12 and/or to the bottom wall (i.e. floor) of the pool 12, a pool drain 18 mounted to the floor of the pool 12, a pool filter 22 disposed along an upper portion of one of the side walls of the pool 12, and a water pump 28 that is configured to receive water from the pool filter 22 and/or the pool drain 18, and subsequently return the water to the pool 12 through the pool jet fittings 14. As shown in FIG. 1A, the pool filter system 10 further includes piping 32 that operatively connects each of the pool jet fittings 14, the pool drain 18, and the pool filter 22 to the water pump 28. It should be appreciated that the pool filter 22 is the portion of the system that cleans the water which can include a trap, a filter, and/or the drain 18.

The pool filter system 10 may be configured to filter water for any pool configuration as desired. For example, the pool filter system 10 may filter water through a pool 12 that is substantially square shaped as illustrated or through an alternatively shaped pool, such as a kidney shaped pool. The pool filter system 10 may be configured to filter or otherwise pump water through a pool 12 that is configured as a swimming pool as illustrated, or any other pool as desired, such as a hot tub or a Jacuzzi bathtub. The pool filter system 10 may include any number of pool jet fittings 14. For example, while the illustrated embodiment of the pool filter system 10 includes ten pool jet fittings 14, it should be understood that the pool filter system 10 may include a single pool jet fitting 14 up to any number of pool jet fittings 14 depending on the size of the pool 12.

The water pump 28 may be a variable speed water pump that is configured to pump the water at least at a first flow rate and at a second flow rate that is greater than the first flow rate. By having multiple flow rates, the water pump 28 may be set to operate at a lower speed (i.e. lower flow rate) and therefore reduce energy use as compared to a single speed water pump that always operates at a high speed. For example, the water pump may operate at a first flow rate of about 20 gallons/minute and at a second flow rate of about 130 gallons/minute. It should be understood, however, that the water pump 28 may be configured to pump water at any desired flow rate(s). As shown in FIG. 1A, the water pump 28 includes a pump inlet 40 and a pump outlet 44. The pump inlet 40 is connected to the pool drain 18 and to the pool filter 22 by piping 32a, and the pump outlet 44 is connected to the pool jet fittings 14 by piping 32b. The pump 28 may be supplied with or otherwise suck in water from the pool 12 through the pool drain 18 and the pool filter 22, and then return or otherwise pump the water back to the pool 12 through the pool jet fittings 14. Therefore, the pool filter system 10 may be considered a closed loop pool pumping filtration system.

As shown in FIG. 1B, in some embodiments the pool jet fittings 14 may be mounted to the side walls of the pool 12, proximate to, but below the surface of the water. As shown, the pool jet fittings 14 may be configured such that the flow of water through the pool jet fittings 14 is directed to the pool surface to thereby agitate the pool surface. The agitation of the pool surface not only directs any debris found on the pool surface toward the pool filter 22, but it also creates a sound that is often times desired. For example, such a sound may indicate that the pool filter system 10 is operating, and/or may be relaxing to a user of the pool.

Figure 2A:
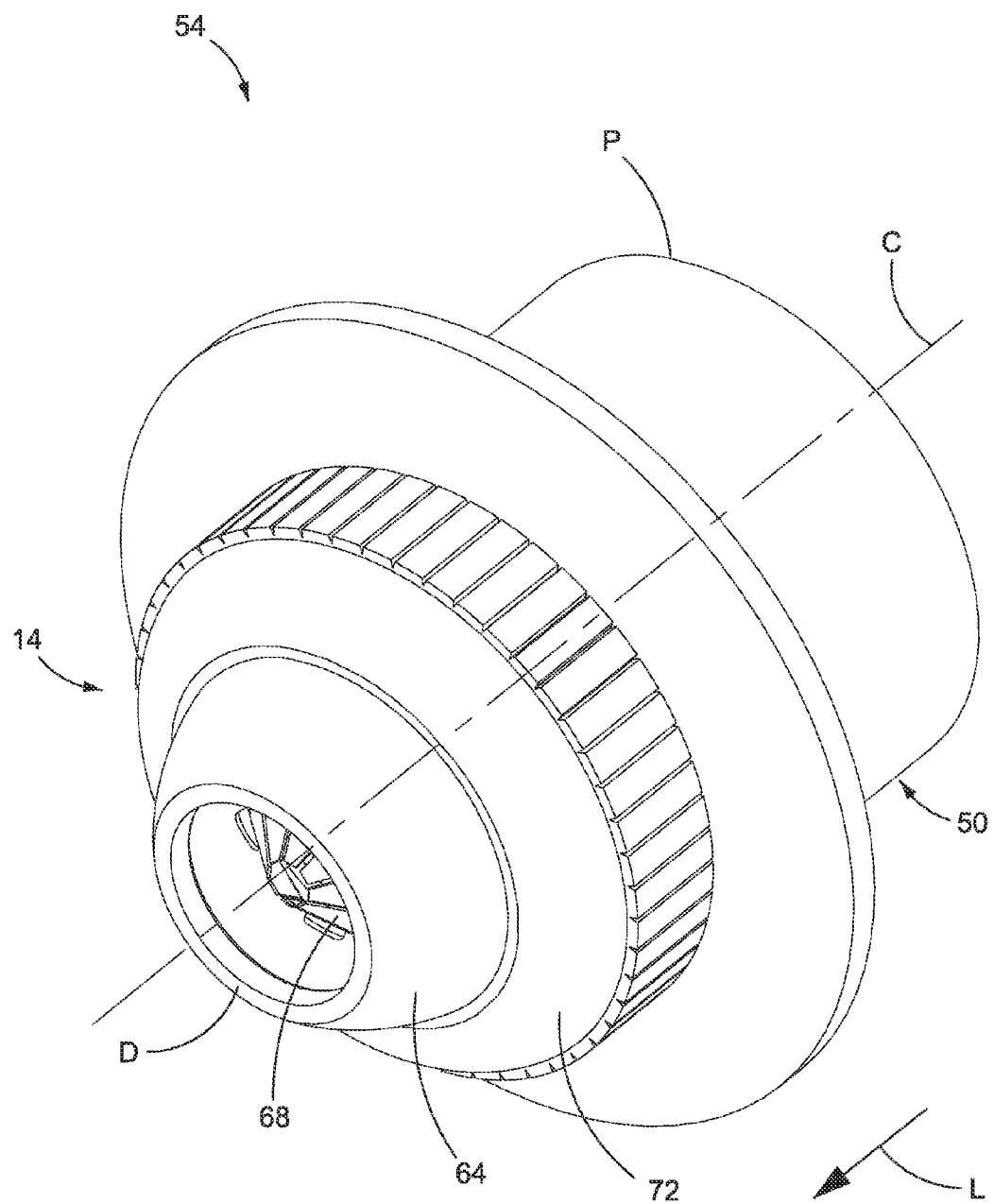
FIG. 2A is a perspective view of a pool jet fitting constructed in accordance with an embodiment, the pool jet fitting coupled to a wall mount that is typically mounted in a wall of a pool.

Now referring to FIGS. 2A and 2B, each pool jet fitting 14 can be configured to be releasably coupled to a respective wall mount 50 that is mounted to the side wall of the pool 12. The pool jet fitting 14, and the wall mount 50 together define a pool jet fitting assembly 54. As shown in FIG. 2A, the assembly 54 defines a distal end D, a proximal end P, and a center axis C that extends along a longitudinal direction L between the proximal end P and the distal end D. The pool jet fitting 14 is configured to self-adjust so as to maintain adequate surface agitation of the pool whether the water pump 28 is operating at high speeds or at low speeds. As shown in FIG. 2B, each pool jet fitting 14 includes a housing 60 that is configured to couple to the wall mount 50, a rotatable insert 64 disposed in the housing 60, and a valve 68 mounted within the rotatable insert 64. The rotatable insert 64 is configured to rotate relative to the housing 60 so as to direct the flow of water from the pool jet fitting 14 toward the pool surface or any other desired direction. The valve 68 is configured to automatically adjust in response to a change in pump output from the second flow rate to the first flow rate to facilitate an outflow velocity of the water from the pool jet fitting 14 that promotes surface agitation of the pool 12. As shown in FIG. 2B, the pool jet fitting 14 further includes a cap 72 that is coupled to the distal end of the housing 60 to thereby retain the rotatable insert 64 and the valve 68 within the housing 60.

Figure 3A:
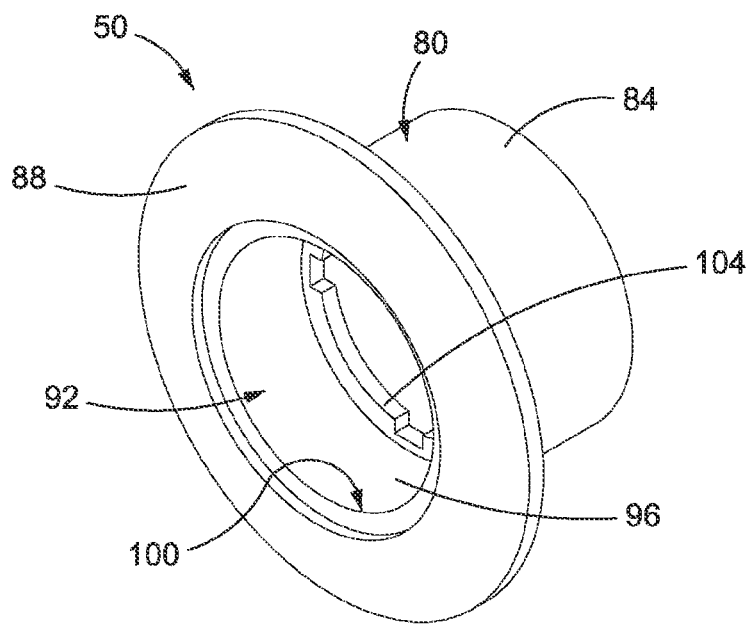
FIG. 3A is a perspective view of the wall mount shown in FIG. 2A.
Figure 3B:
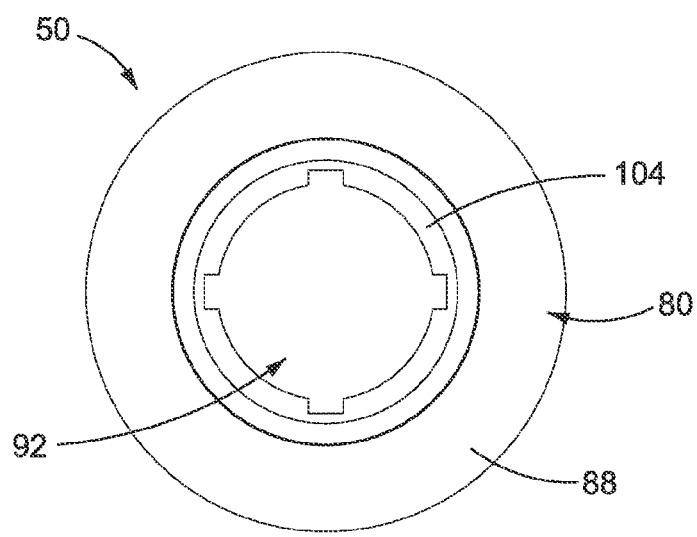
FIG. 3B is a front elevation view of the wall mount shown in FIG. 3A.
Figure 3C:
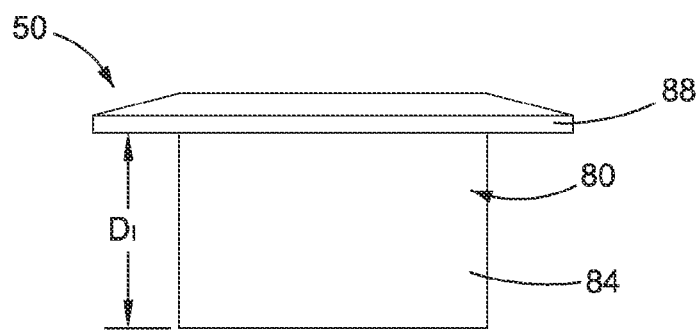
FIG. 3C is a side elevation view of the wall mount shown in FIG. 3A.

Referring to FIGS. 3A-3C, the wall mount 50 may be a pre-existing or standard wall mount already attached to the side wall of the pool 12. Therefore, the pool jet fitting 14 may be sized and configured to be coupled to a wall mount 50 of a pre-existing pool. It should be understood, however, that the wall mount 50 may be a standard wall mount to be used in a newly built pool or a new wall mount that is different than the current standard wall mounts. As shown in FIG. 3A, the wall mount 50 includes a wall mount body 80 that defines a tubular portion 84 and a shoulder 88 that extends radially outward from a distal end of the tubular portion 84. The wall mount body 80 further defines a bore 92 that extends through the wall mount body 80 from the proximal end to the distal end of the body 80. The bore 92 is configured to receive water from the water pump 28.

The tubular portion 84 is configured to be glued or otherwise affixed within a bore defined by the side wall of the pool 12. As shown in FIG. 3C, the tubular portion 84 has a length $D_1$ that is defined between the proximal end of the tubular portion 84 and an inner surface of the shoulder 88. The length $D_1$ of the tubular portion 84 is between about 1.25 inches and about 1.75 inches, and typically is about 1.5 inches for standard wall mounts 50. When the wall mount 50 is affixed to the pool side wall, the tubular portion 84 will extend into the side wall until an inner surface of the shoulder 88 abuts the surface of the pool side wall.

As shown in FIGS. 3A and 3C, the wall mount 50 further includes a coupler, such as internal threads 96 that extend out from an inner surface 100 of the bore 92 of the wall mount body 80 proximate to a distal end of the wall mount 50. The threads 96 are configured to engage threads of the housing 60 so as to releasably couple the housing 60 to the wall mount 50. It should be understood, however, that the wall mount 50 is not limited to threads 96, and that the wall mount 50 may include any coupler that is capable of releasably coupling the housing 60 to the wall mount 50.

As shown in FIGS. 3A and 3B, the wall mount 50 further includes a lip 104 that extends out from the inner surface 100 of the bore 92 proximal to the threads 96. The lip 104 is configured to act as a stop and prevent over insertion of the housing 60 when the housing 60 is inserted into the bore 92 and coupled to the wall mount 50.

Figure 4A:
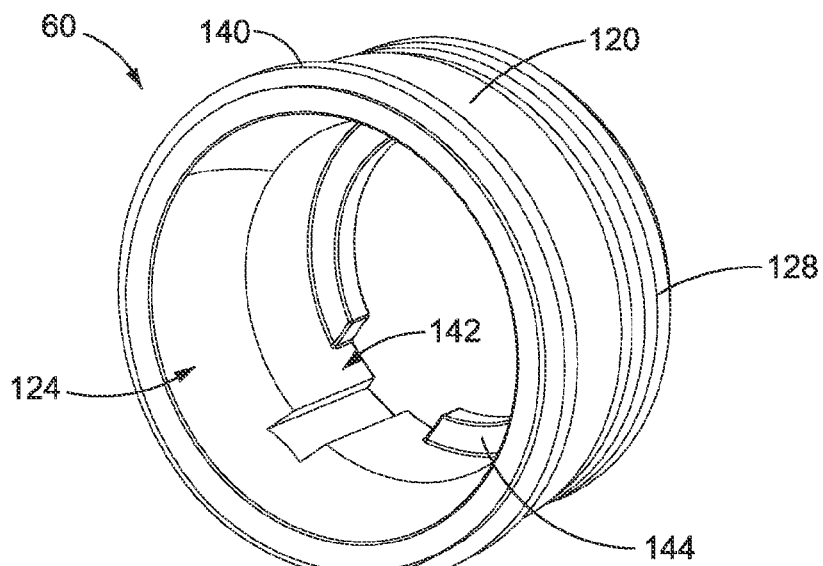
FIG. 4A is a perspective view of the housing shown in FIG. 2A.
Figure 4B:
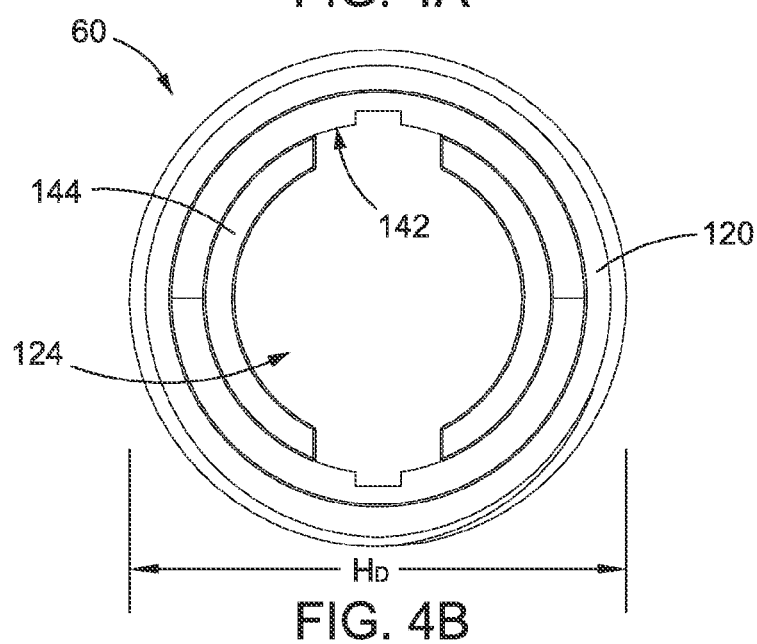
FIG. 4B is a front elevation view of the housing shown in FIG. 4A.
Figure 4C:
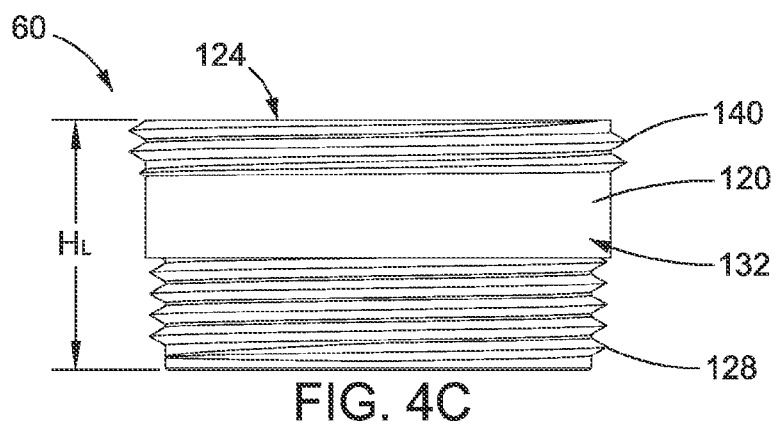
FIG. 4C is a side elevation view of the housing shown in FIG. 4A.

Referring to FIGS. 4A-4C, the housing 60 includes a tubular body 120 that defines a bore 124 that extends longitudinally through the body 120. The tubular body 120 is configured to be releasably coupled to the wall mount 50 such that when coupled, the bore 124 of the housing 60 is in line with or otherwise coaxial with the bore 92 of the wall mount 50. Therefore, like the wall mount 50, the housing 60 is configured to receive the water from the water pump 28. As shown in FIGS. 4B and 4C, the housing 60 is configured to have a longitudinal length $H_1$ that is between about 0.8 inches and about 2.0 inches, and an outer diameter $H_D$ that is between about 1.75 inches and about 2 inches. Typically, a standard housing is configured to have a length $H_1$ of about 1 inch, and a diameter $H_D$ of about 1.875 inches. As shown, the tubular body 120 defines a first coupler, such as external threads 128 that extend out from an external surface 132 of the body 120 proximate to the proximal end of the housing 60. The threads 128 are configured to engage the internal threads 96 of the wall mount 50 to thereby releasably couple the housing 60 to the wall mount 50. In particular the housing 60 is threaded into the bore 92 of the wall mount 50 until the proximal end of the housing 60 abuts the lip 104 within the bore 92. At this point, the housing 60 will be fully coupled to the wall mount 50.

The tubular body 120 further defines a second coupler, such as external threads 140 that extend out from the external surface 132 of the body 120 proximate to the distal end of the housing 60. The threads 140 are configured to engage threads of the cap 72 so as to releasably affix the cap 72 to the distal end of the housing 60. It should be understood, however, that the housing 60 is not limited to threads 128 and 140, and that the housing 60 may include any coupler that is capable of releasably coupling the housing 60 to the wall mount 50 and the cap 72 to the housing 60.

As shown in FIGS. 4A and 4B, the housing 60 further includes a lip 144 that extends out from an inner surface 142 of the bore 124 proximate to the proximal end of the housing 60. The lip 144 is configured to act as a stop and prevent over insertion of the rotatable insert 64 and the valve 68 when the rotatable insert 64 and the valve 68 are placed within the bore 124 of the housing 60. Moreover, when the cap 72 is coupled to the external threads 140 of the housing 60 the rotatable insert 64 and the valve 68 will be locked or otherwise held within the bore 124 of the housing 60 between the cap 72 and the lip 144.

Referring now to FIGS. 2A and 5A-5D, the valve 68 is configured to be positioned within the bore 124 of the housing 60, and defines an adjustable opening 160 that defines a dimension $D_V$ capable of automatically adjusting between a first dimension and a second dimension to facilitate an outflow velocity of the water received from the water pump 28 that agitates the surface of the pool and/or performs some other desired function. For example, the adjustable opening 160 is configured to automatically adjust so as to maintain an outflow velocity of the water that agitates the surface of the pool as the flow rate of the water flow from the water pump 28 changes. The dimension $D_V$ of the adjustable opening 160 may be capable of automatically adjusting between a first dimension that is about 0.187 inches, and a second dimension that is about 1 inch. It could also be said that the adjustable opening 160 may be capable of automatically adjusting between a first area that is about 0.027 in$^2$, and a second area that is about 0.785 in$^2$. It should be understood, however, that the first and second dimensions may be any dimension as desired, and the first and second areas may be any area as desired. Moreover, while the dimension $D_V$ is illustrated as a diameter, it should be understood that the dimension $D_V$ may alternatively be a width, or a height.

Figure 5A:
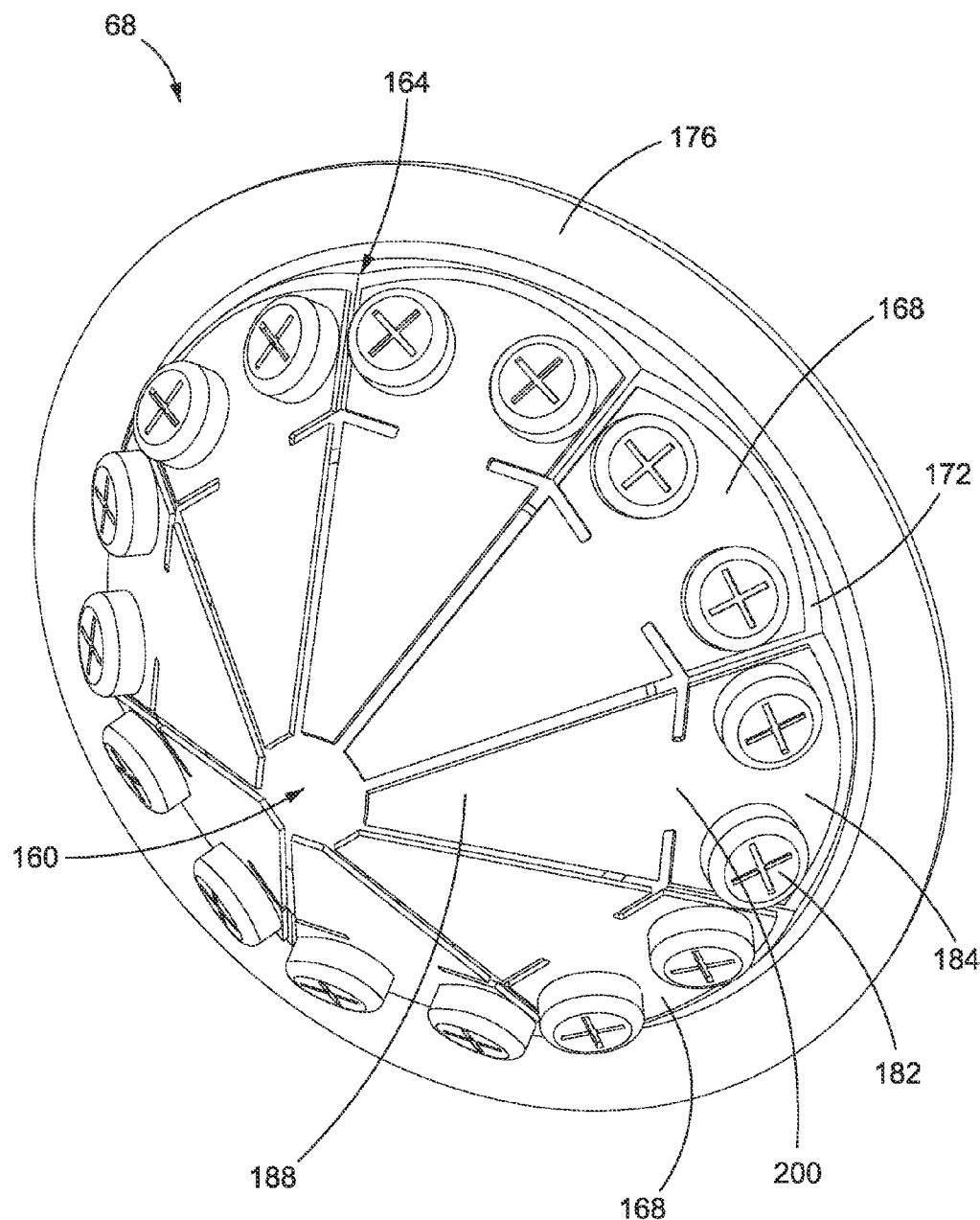
FIG. 5A is a perspective view of the valve shown in FIG. 2A, the valve including a valve body and a plurality of flexible member extending from the valve body.
Figure 5B:
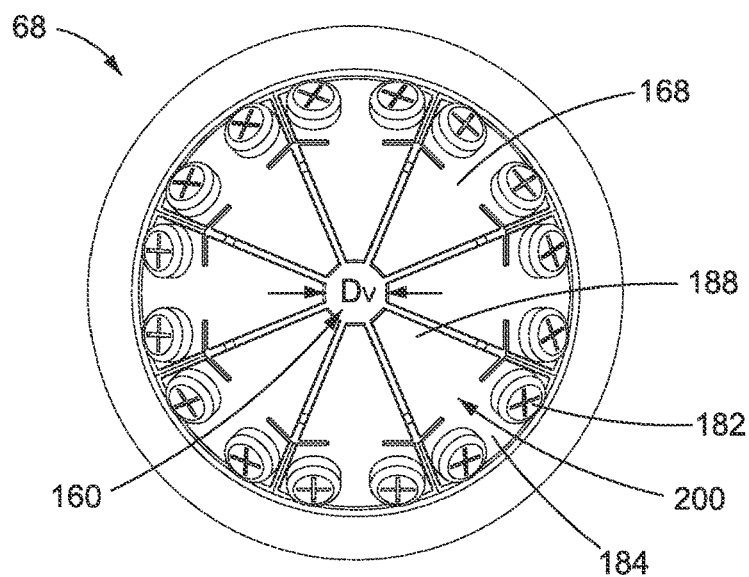
FIG. 5B is a front elevation view of the valve shown in FIG. 5A.
Figure 5C:
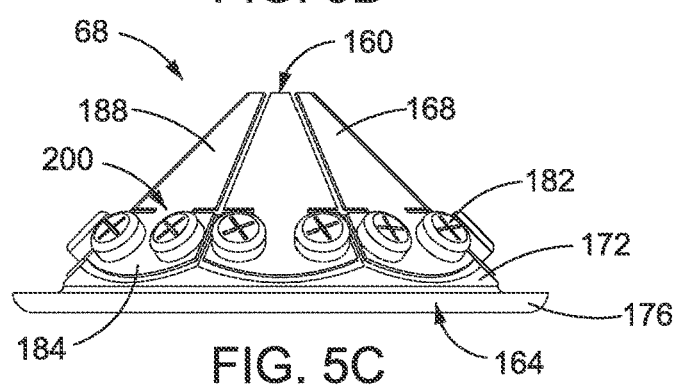
FIG. 5C is a side elevation view of the valve shown in FIG. 5A.
Figure 5D:
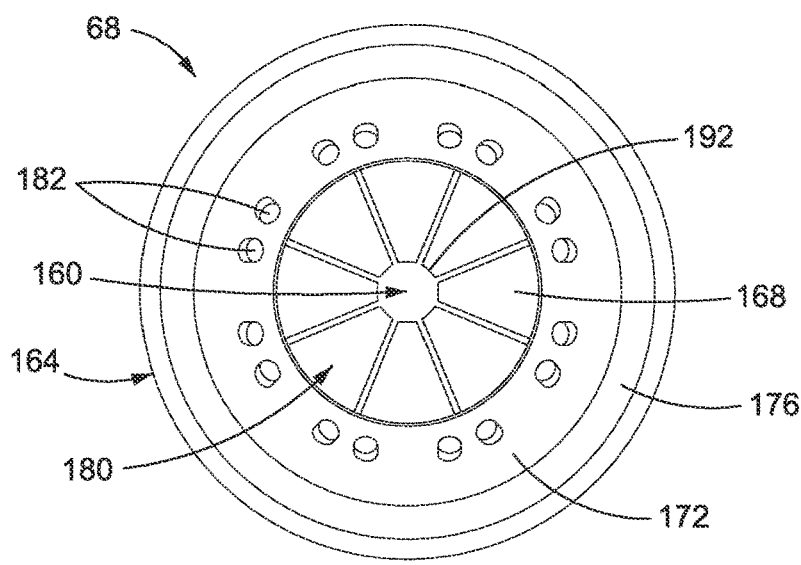
FIG. 5D is a rear elevation view of the valve shown in FIG. 5A.

As shown in FIGS. 5A and 5D, the valve 68 includes a valve body 164, and a plurality of members 168 that extend distally from the valve body 164. As shown in FIGS. 5B-5D, the valve body 164 defines a member support portion 172, a shoulder 176 that extends radially outward from a proximal end of the member support portion 172, and a bore 180 that extends longitudinally through the body 164. As shown, the member support portion 172 angles toward the center axis of the valve 68 as the member support portion 172 extends distally. Therefore, the bore 180 includes a diameter that decreases as the bore 180 extends distally through the valve body 164. The bore 180 of the valve 68 is configured to receive the water flow from the water pump 28 as it flows through the wall mount 50 and the housing 60, and directs the water flow toward the adjustable opening 160 that in the illustrated embodiment is defined by the members 168.

As shown in FIG. 5D, the shoulder portion 172 which extends radially outward from a proximal end of the member support portion 172 is substantially planar and is configured to be disposed within the bore 124 of the housing 60. In some embodiments, the shoulder portion 172 may be configured to abut against the lip 144 of the housing 60 when the valve 68 is fully inserted within the bore 124 of the housing 60.

As shown in FIGS. 5A-5C, each member 168 lies flush against the member support portion 172 such that the members 168 together define a substantially cone shaped structure. That is, as the members 168 extend distally they extend toward the center axis of the valve 68. The members 168 and the valve body 164 may be formed or otherwise molded as a single unit or the members 168 may be coupled to the valve body 164 with fixation elements 182 as illustrated. In the illustrated embodiment, each member 168 is coupled to the valve body 164 by two fixation elements 182 that define screws.

Figure 6:
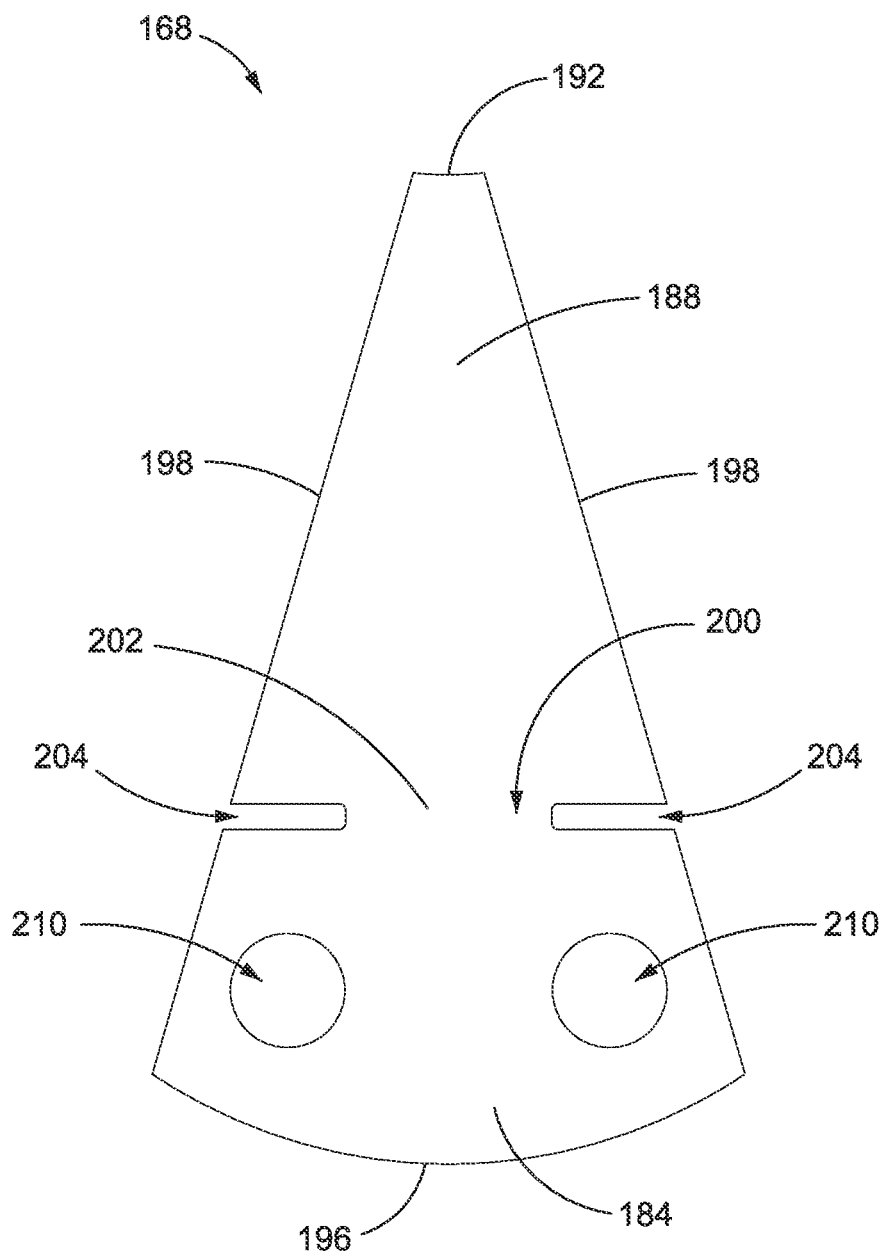
FIG. 6 is a top plan view of one of the plurality of flexible members of the valve shown in FIG. 5A.

As shown in FIG. 6, each member 168 is configured to flex outwardly and includes a coupling portion 184 and a flexing portion 188 that extends distally from the coupling portion 184. Each member 168 is substantially triangular in shape and defines a distal end 192 and a proximal end 196 that is wider than the distal end 192. As shown, the distal end 192 of the member 168 is substantially flat. Therefore, together, the distal ends 192 of all of the members 168 define the adjustable opening 160, which in the illustrated embodiment is substantially circular. Each member 168 further defines outer sides 198 that converge toward each other as they extend distally and terminate at the distal end 192. The members 168 may be made of any material as desired. For example, the members 168 may be made of a flexible material, such as natural or synthetic rubbers (i.e. latex, neoprene, EPDM, nitrile), polysiloxanes (i.e. liquid silicone rubber), thermoplastic elastomers (i.e. Santoprene or polyurethane TPE-S, styrene-ethylene/butylene-styrene), or fluorocarbon elastomers (i.e. Viton or Technoflon).

As shown in FIG. 6, each coupling portion 184 defines a pair of holes 210 that extend through the coupling portion 184. The holes 210 are configured to receive the fixation elements 182 so as to couple the member 168 to the member support portion 172 of the valve body 164.

As shown in FIG. 6, each member 168 further includes a hinge 200 that connects the flexing portion 188 to the coupling portion 184. The hinge 200 is a weakened portion 202 defined between a pair of slits 204 that allows the flexing portion 188 to flex relative to the coupling portion 184. As shown, the flexing portion 188, the coupling portion 184, and the hinge 200 are integrally formed as a single unit. It should be understood, however, that the hinge 200, the coupling portion 184, and the flexing portion 188 may each define separate units that are combined to form the member 168. It should also be understood, that the hinge 200 may be any portion of the member 168 that allows the flexing portion 188 to flex relative to the coupling portion 184.

Figure 7A:
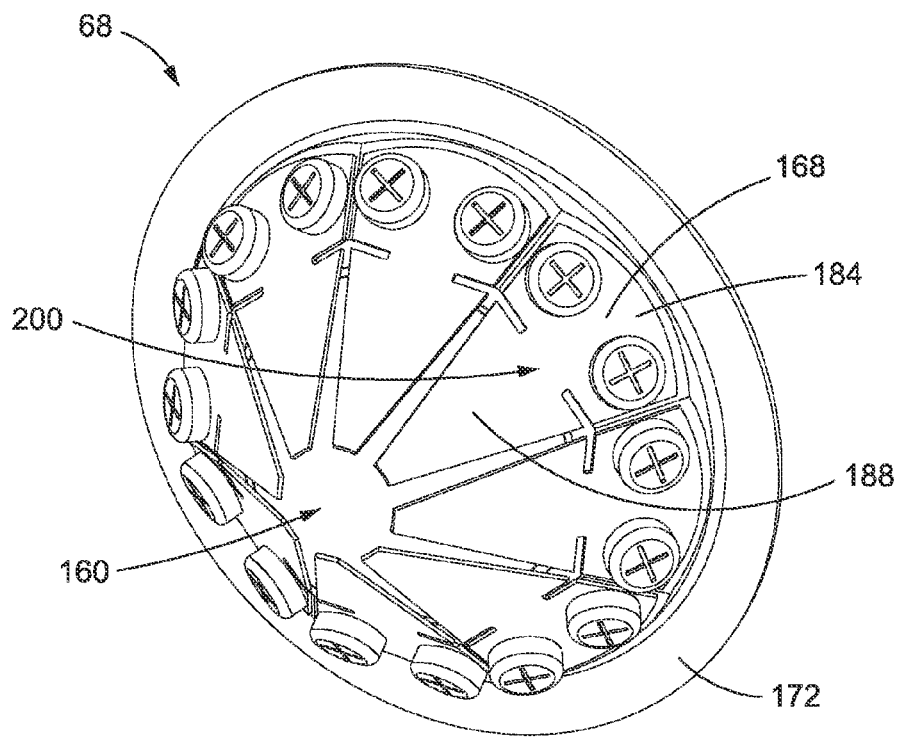
FIG. 7A is a perspective view of the valve shown in FIG. 5A in an expanded position.
Figure 7B:
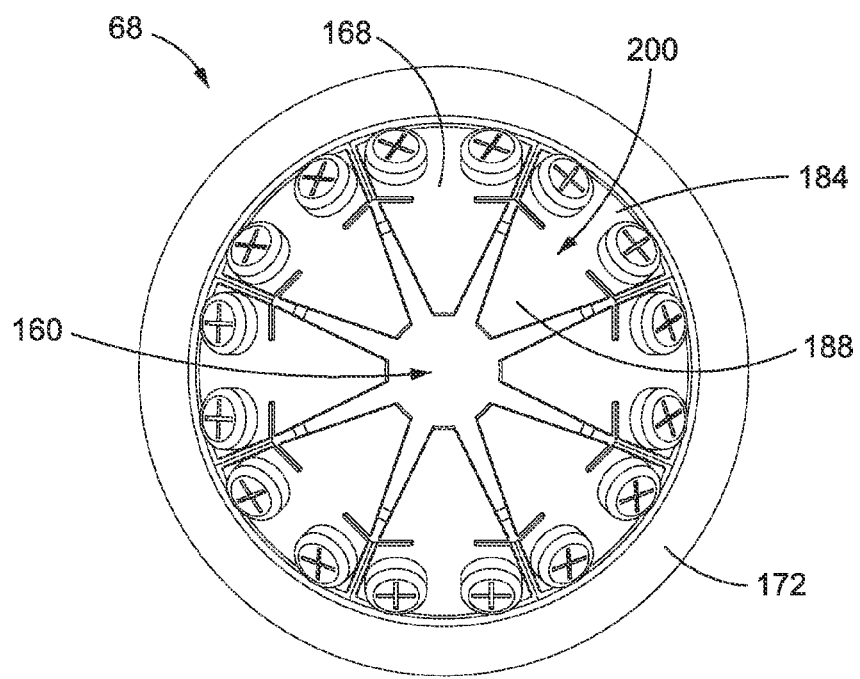
FIG. 7B is a front elevation view of the valve shown in FIG. 7A.

Referring now to FIGS. 7A and 7B, each member 168 is configured to flex, such that when the flow rate of the water from the water pump 28 increases, the members 168 flex outwardly to thereby increase the dimension of the adjustable opening 160. That is, each flexing portion 188 pivots about a respective hinge 200 so as to widen the adjustable opening 160 from a first or initial dimension as shown in FIG. 5B, to a second or expanded dimension as shown in FIG. 7B. Because the valve 68 includes an adjustable opening 160, the valve 68 is configured to maintain a predetermined outflow velocity of water through the pool jet fitting 14 as the flow rate of the water flow from the water pump 28 changes. The predetermined outflow velocity may correspond to a range of velocities having a minimum velocity at which the water flow is visible or otherwise agitates the surface of the pool. For example, the predetermined outflow velocity may have a minimum velocity of 15 ft/s. It should be understood, however, that the predetermined outflow velocity may be any velocity as desired, and may include any minimum velocity as desired. Moreover, the predetermined outflow velocity may depend on a variety of factors, such as the piping, the pump, and the position of the pool jet fitting assemblies.

Figure 8A:
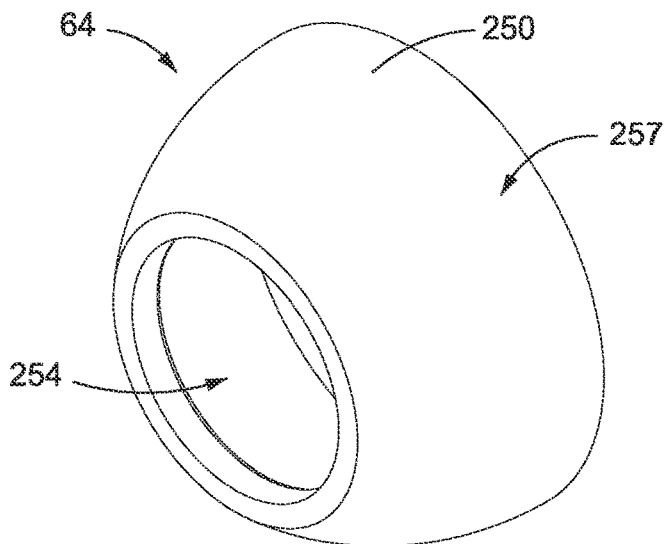
FIG. 8A is a perspective view of the rotatable insert shown in FIG. 2A.
Figure 8B:
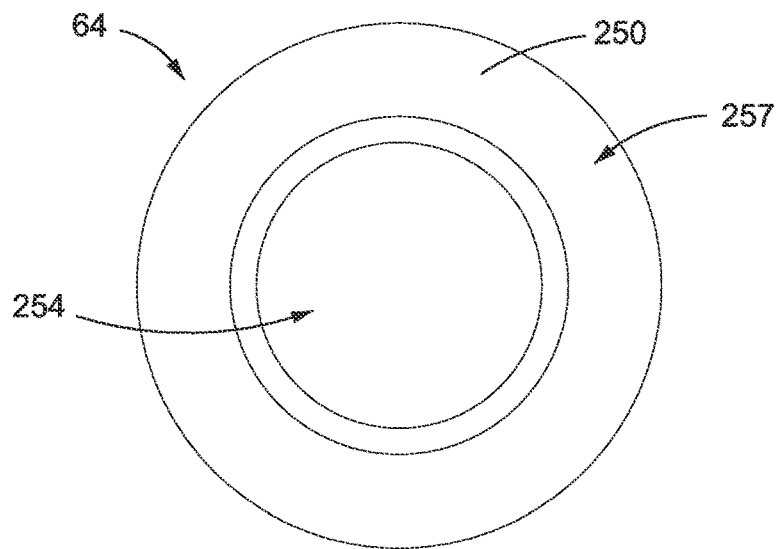
FIG. 8B is a front elevation view of the rotatable insert shown in FIG. 8A.
Figure 8C:
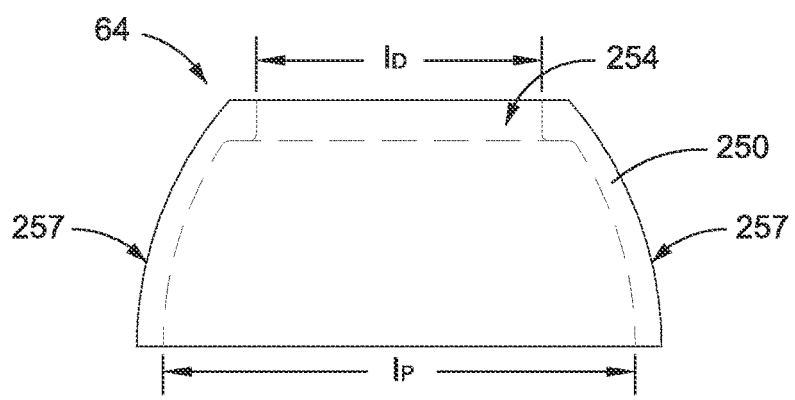
FIG. 8C is a side elevation view of the rotatable insert shown in FIG. 8A.

Referring now to FIGS. 8A-8C, the rotatable insert 64 includes an insert body 250 that defines a passage 254 that extends longitudinally through the body 250. The insert body 250 is substantially cylindrical and defines an outer surface 257 that curves radially inward as the body 250 extends distally. Therefore, the passage 254 may define a proximal diameter $I_P$ between about 1.375 inches and about 1.625 inches, and a distal diameter $I_D$ between about 1 inch and about 1.25 inches. A standard insert 64 may define a proximal diameter $I_P$ of about 1.5 inches, and a distal diameter $I_D$ of about 1.125 inches. It should be understood, however, that the insert 64 may include any proximal diameter $I_P$ and distal diameter $I_D$ as desired.

The insert 64 is configured to be disposed within the bore 124 of the housing 60. The insert 64 is configured to be disposed within the bore 124 of the housing 60 such that the insert 64 is capable of rotating relative to the housing 60. Therefore, when the pool jet fitting 14 is coupled to the wall mount 50, the insert 64 can be rotated so as to position the insert such that the passage 254 of the insert 64 is directed or otherwise extending towards the pool surface. Water flow from the water pump 28 will then be directed to the surface of the pool to create the desired agitation.

The passage 254 of the insert 64 may be sized to receive the valve 68 such that the valve 68 rotates along with the rotatable insert 64, when the rotatable insert 64 is rotated. Therefore, the adjustable opening 160 of the valve 68 can face the surface of the pool 12 when the insert 64 is rotated to face the surface of the pool 12.

Referring to FIGS. 1A and 9A-9C, the cap 72 is configured to be coupled to the housing 60 to thereby hold the insert 64 and the valve 68 within the housing 60. The cap 72 includes a substantially cylindrical cap body 252 that defines a bore 256 that extends longitudinally through the body 252. The cap 72 further includes a coupler, such as internal threads 258 that extend out from an internal surface 262 of the bore 256. The threads 258 are configured to engage the threads 140 of the housing 60 to thereby releasably affix the cap 72 to the distal end of the housing 60 and retain the insert 64 and the valve 68 within the housing 60. It should be understood, however, that the cap 72 is not limited to threads 258, and that the cap 72 may include any coupler that is capable of releasably coupling the cap 72 to the housing 60.

Figure 9A:
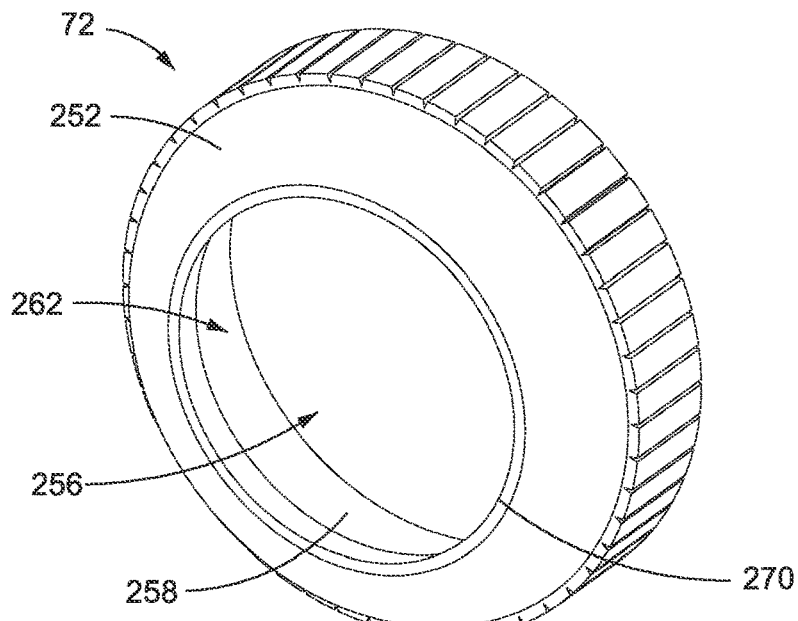
FIG. 9A is a perspective view of the cap shown in FIG. 2A.
Figure 9B:
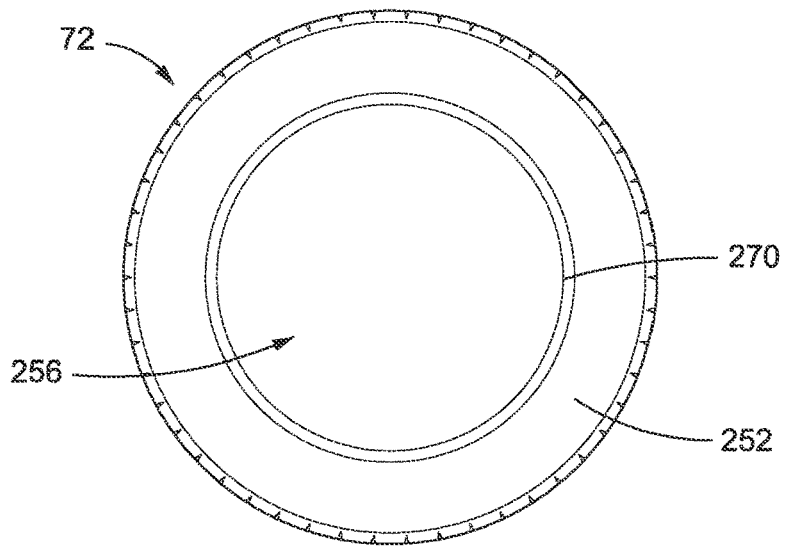
FIG. 9B is a front elevation view of the cap shown in FIG. 9A.
Figure 9C:
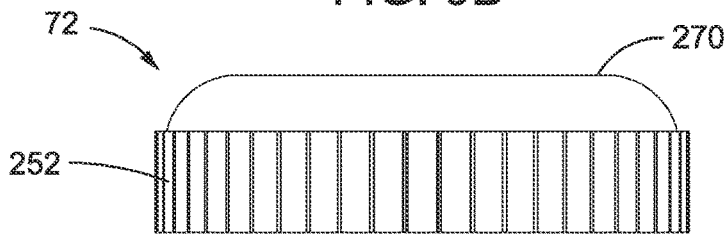
FIG. 9C is a side elevation view of the cap shown in FIG. 9A.

Referring to FIGS. 2A and 9A, the cap 72 bore 256 extends through the cap body 252 and terminates at an opening 270 defined by a distal end of the cap body 252. The opening 270 includes a diameter that is less than the diameter of the bore 256. As shown in FIG. 2A, a portion of the rotatable insert 64 extends through the opening 270 when the cap 72 is coupled to the housing 60. Therefore, the insert 64 may be rotated while the pool jet fitting 14 is completely assembly and coupled to the wall mount 50.

In operation, the pool jet fitting 14 can be configured to maintain a desired surface agitation whether the water pump 28 is operating at high speeds or at low speeds. For example, when the water pump 28 is operating at high speeds the water flow from the pump will be at a high velocity. As the high velocity water flow passes through the valve 68, the members 168 will flex outward thereby increasing the diameter and thus the area of the adjustable opening 160 of the valve 68. When the water pump 28 is changed from operating at high speeds to operating at low speeds the water flow from the pump 28 will decrease to a lower velocity as compared to when the pump is operating at high speeds. As the low velocity water flow passes through the valve 68, the members 168 will return to their non-flexed state thereby decreasing the diameter and thus the area of the adjustable opening 160 of the valve 68. Because the opening 160 has a smaller diameter when the pump 28 is operating at low speeds, the outflow velocity of the water will be increased to thereby maintain an outflow velocity that agitates the surface of the pool. Therefore, the pool jet fitting 14 will maintain a substantially similar outflow velocity, or at least maintain an outflow velocity within a specified range that agitates the surface of the pool whether the pump 28 is operating at high speeds or at low speeds.

Figure 10:
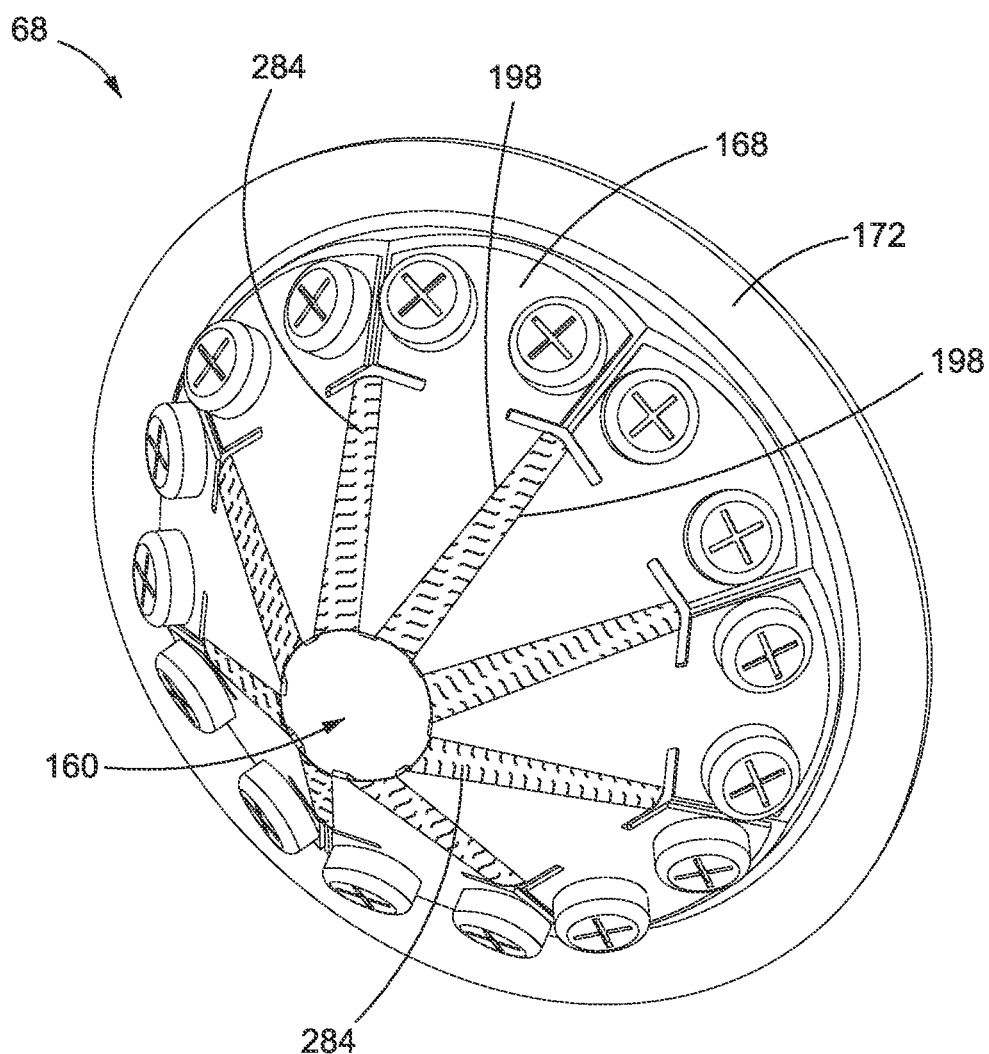
FIG. 10 is a perspective view of a valve in accordance with another embodiment, the valve including a plurality of extendable sections, each extendable section being coupled to a pair of adjacent members.

In another embodiment, and in reference to FIG. 10, the valve 68 may include a plurality of extendable sections 284, each extendable section being coupled to a pair of adjacent members 168. The extendable sections 284 are configured to expand as the members 168 flex outwardly to thereby cover any gaps formed between adjacent members 168 when the members 168 have fully flexed. By covering the gaps, the outflow velocity of the water through the valve 68 may be more easily controlled. That is, when the valve 68 includes the extendable sections 284, the water flow only exits the adjustable opening 160 whether the members are flexed or not. The extendable sections 284 may be made from any material capable of expanding. For example, the extendable sections 284 may be made from a rubber, a cloth-like material, or even be structured like an accordion.

As shown, the extendable sections 284 are coupled to the outer sides 198 of the members 168. It should be understood, however, that the extendable sections 284 may be coupled to any part of the members 168. For example, the extendable members 284 may each define a sleeve that is coupled to the members 168 by being wrapped around the members 168. Moreover, the extendable sections 284 may be separate components from the members 168 or the members 168 and the extendable sections 284 may be integrally formed as a monolithic unit.

Figure 11A:
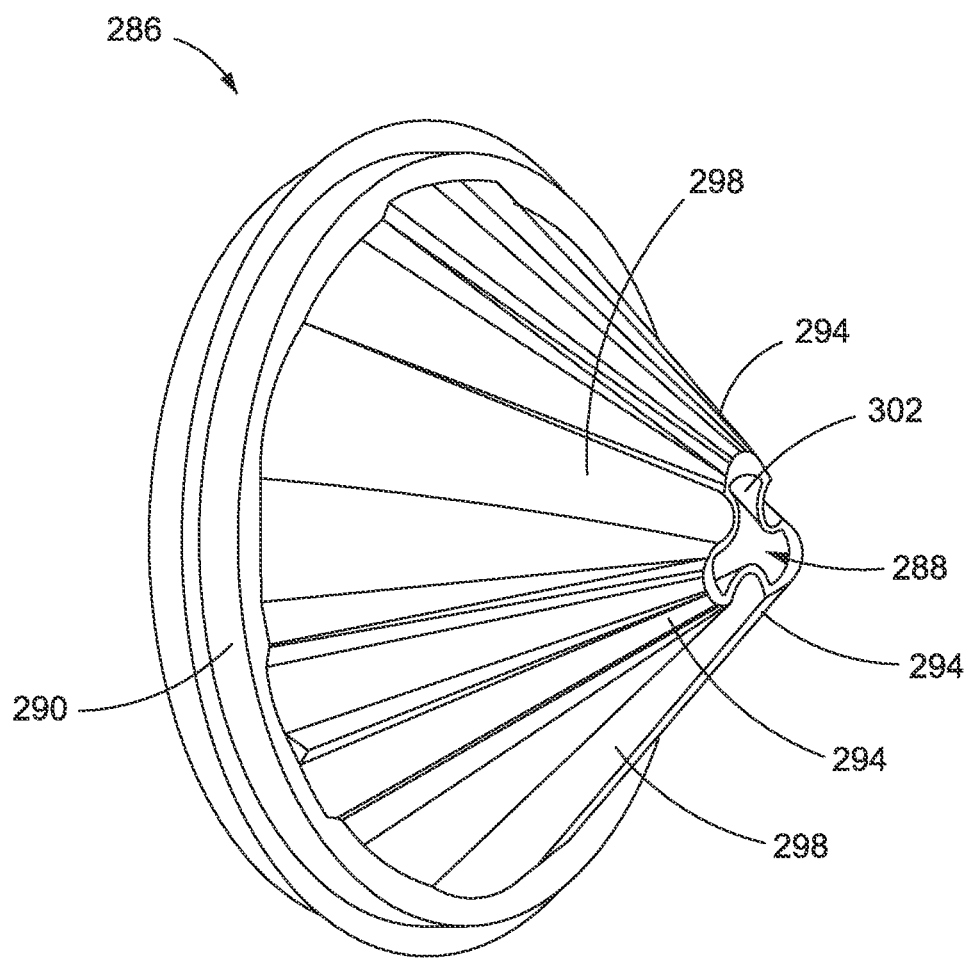
FIG. 11A is a perspective view of a valve in accordance with another embodiment, the valve including a plurality of extendable sections and flexible members that are integrally formed as a monolithic unit and define a star shaped adjustable opening.
Figure 11C:
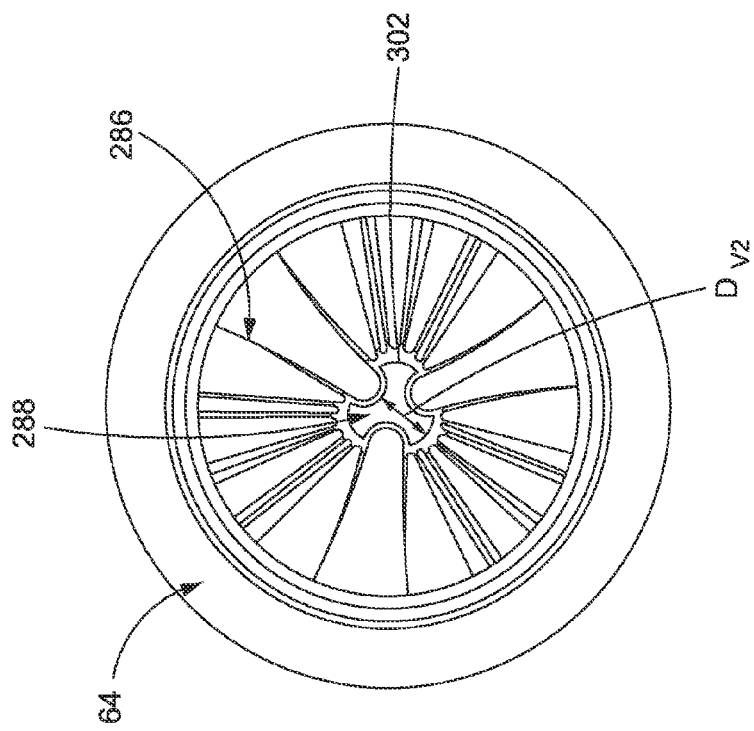
FIG. 11C is a front elevation view of the valve and insert of FIG. 11B.
Figure 11B:
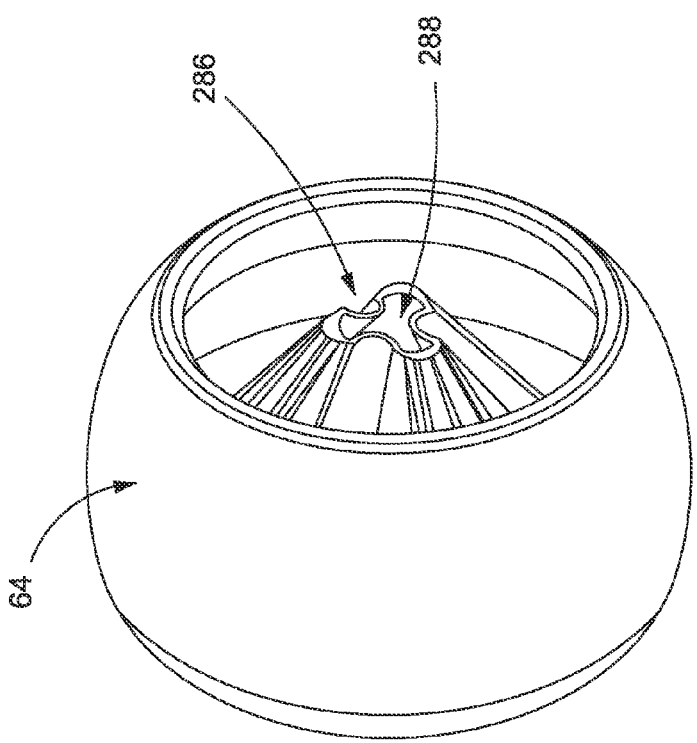
FIG. 11B is a perspective view of the valve shown in FIG. 11A coupled within the insert shown in FIG. 8A.

In another embodiment and in reference to FIGS. 11A-11C, a valve 286 can define an adjustable opening 288 that is star shaped and defines a dimension $D_{V2}$ capable of automatically adjusting between a first dimension and a second dimension to facilitate an outflow velocity of the water received from the water pump 28. For example, the adjustable opening 288 is configured to automatically adjust so as to maintain an outflow velocity of the water as the flow rate of the water flow from the water pump 28 changes. Therefore, similar to the valve 68 shown in FIGS. 5A-5D, the valve 268 is capable of maintaining the outflow velocity of the pool jet fitting 14 whether the water pump 28 is operating at high speeds or at low speeds.

The valve 286 includes a valve body 290, and a plurality of members 294 that extend distally from the valve body 290. The valve further includes a plurality of extendable sections 298, each extendable section 298 being coupled to a pair of adjacent members 294. The extendable sections 298 are configured to expand as the members 294 flex outwardly. The valve 286 is monolithic. That is, the valve body 290, the members 294, and the extendable sections 298 are integrally formed as a single unit. For example, the valve 286 can be molded out of a flexible material, such as natural or synthetic rubbers (i.e. latex, neoprene, EPDM, nitrile), polysiloxanes (i.e. liquid silicone rubber), thermoplastic elastomers (i.e. Santoprene or polyurethane), or fluorocarbon elastomers (i.e. Viton or Technoflon).

As shown in FIGS. 11B and 11C, the adjustable opening 288 can be defined by the distal ends of the members 294 and the extendable sections 298. As shown, the extendable sections 298 can be concave when the members 294 are in a relaxed state such that the adjustable opening 288 is star shaped and defines three spoke sections 302. When the members 294 flex outwardly, however, the extendable sections can extend so as to be convex such that the adjustable opening 288 is circular shaped. It should be appreciated, however, that the adjustable opening can have any shape as desired, any number of spoke sections 302 as desired, and can have a shape that changes as the dimension $D_{V2}$ changes. For example, the opening can have a circular shape.

With continued reference to FIGS. 11B and 11C, the valve 286 can be coupled to the insert 64 such that the valve 286 and the insert 64 are a single unit. In particular, the valve 286 can be coupled to the insert 64 such that the members 294 and extendable sections 298 extend within the passageway 264 of the insert 64. Therefore, the adjustable opening 288 can be directed in a desired direction by rotating the insert 64.

Figure 12:
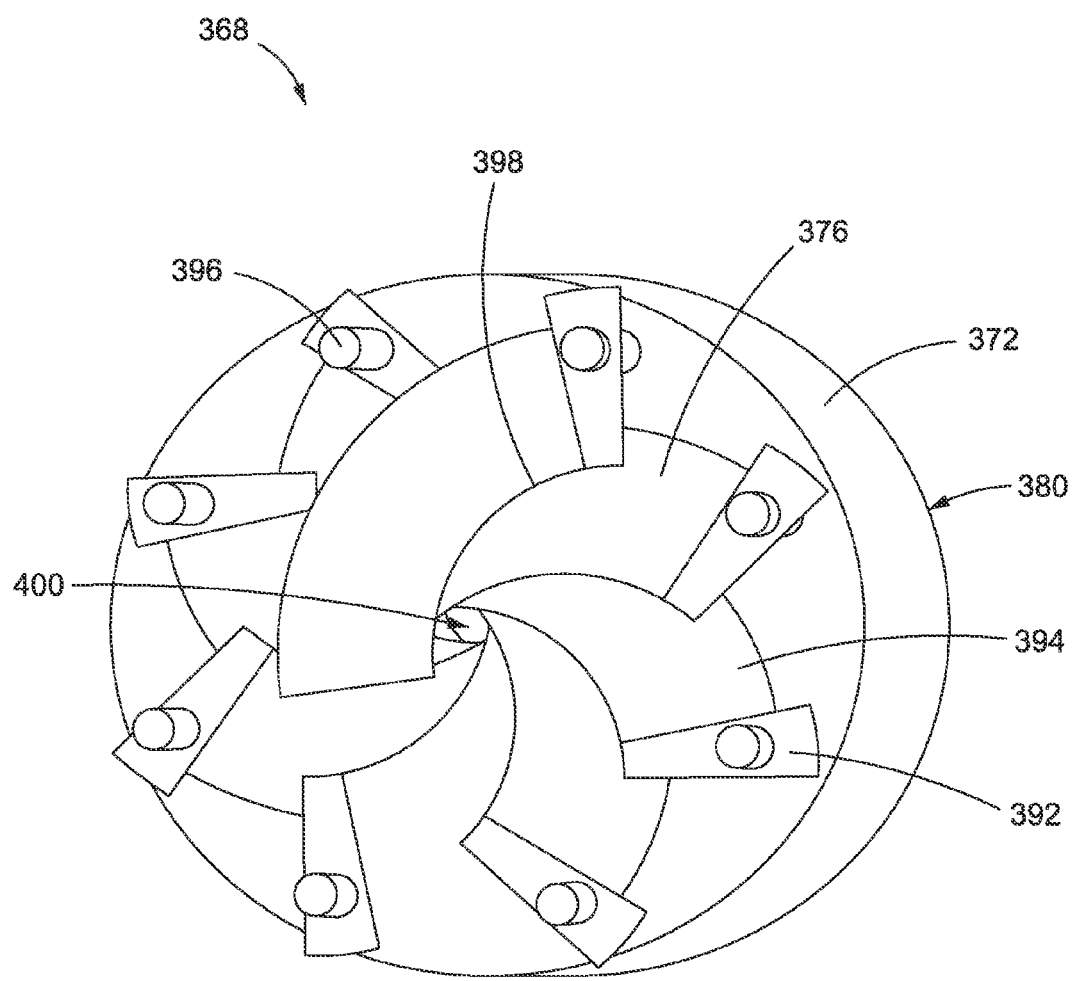
FIG. 12 is a schematic of a valve in accordance with another embodiment, the valve including a valve body and a plurality of members that are configured to rotate and lift when the pool jet fitting receives a high velocity of water flow from the water pump.

In another embodiment, and in reference to FIG. 12, the pool jet fitting 14 may include a valve 368 having a valve body 372 and a plurality of members 376 that are rotatably coupled to the valve body 372. The members 376 are configured to flex and rotate relative to the valve body 372 as the water flow from the water pump increases in velocity. The valve body 372 is substantially cylindrical and defines a bore 380 that extends longitudinally through the body 372.

As shown in FIG. 12, each member 376 is substantially curved and includes a coupling portion 392, and a flexing portion 394 that extends distally from the coupling portion 392. The coupling portion 392 is coupled to the body 372 with a fixation element, such as a peg 396 such that that member 376 is capable of rotating about the peg 396. The members 376 are coupled to the body 372 such that the members 376 surround the bore 380. The flexing portion 394 defines a curved inner surface 398. As shown, the curved inner surfaces 398 of the members 376 together define an adjustable opening 400 through which the water flow may pass.

As shown in FIG. 12, each member 376 further includes a hinge that couples the flexing portion 394 to the coupling portion 392. As water flow through the valve 368 increases, the members 376 will rotate about their pegs 396 and their flexing portions 394 will flex outwardly. As the members 376 rotate and the flexing portions 394 flex, a dimension (i.e.

diameter) of the adjustable opening 400 will increase. Therefore, similar to the valve 68 shown in FIGS. 5A-5D, the valve 368 is capable of maintaining the outflow velocity of the pool jet fitting 14 whether the water pump 28 is operating at high speeds or at low speeds.

Figure 13:
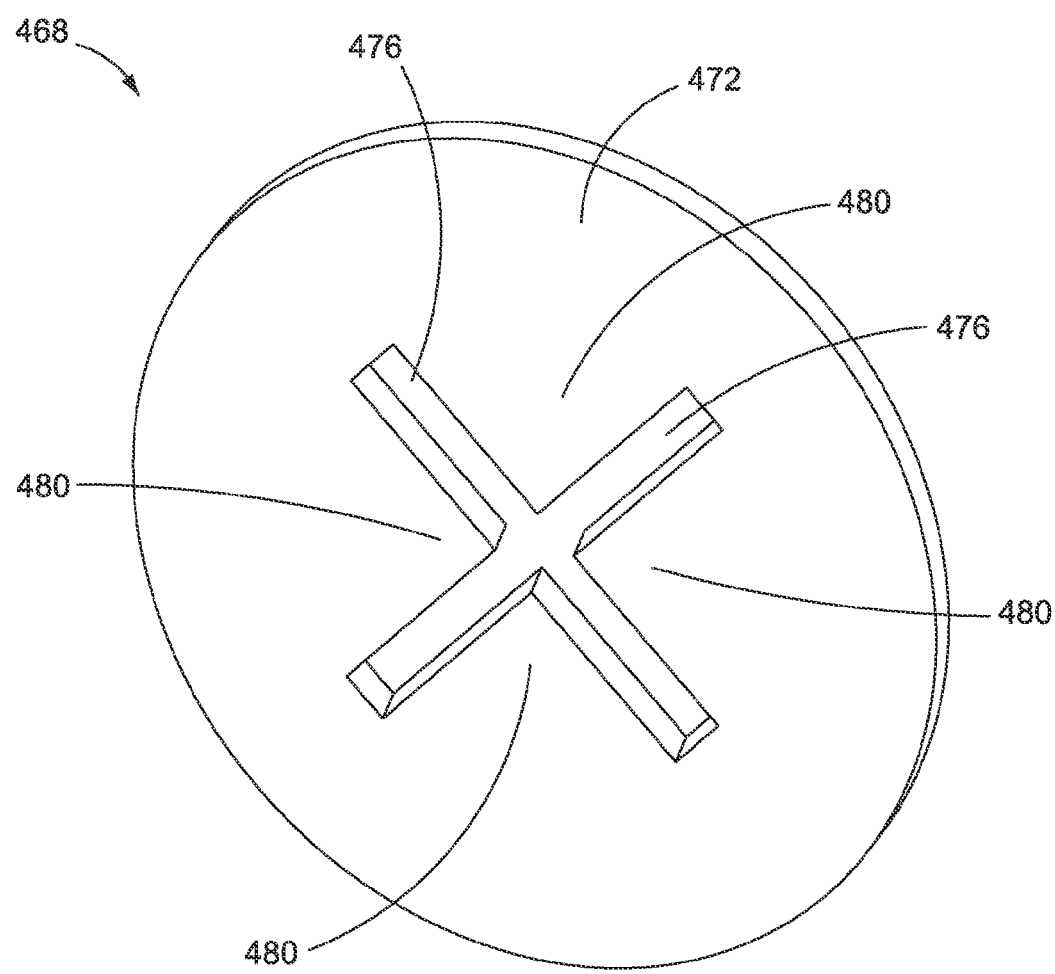
FIG. 13 is a perspective view of a valve in accordance with another embodiment, the valve including a valve body having at least two slots that define at least four flexible portions.

In another embodiment and in reference to FIG. 13, the pool jet fitting 14 may include a valve 468 having a valve body 472 that is capable of being positioned in the bore of the housing. The valve 468 includes at least one, such as two slits 476 that define at least two, such as four flexible members 480. In the illustrated embodiment, the valve 468 includes two slits that are in a cross-like configuration and define four wedge shaped flexible members 480, though it should be understood that any configuration may be desired. For example, the slits 476 may define a T-shaped, or Y-shaped configuration. As with the valve 68, the flexible members 480 are configured to flex outwardly as water flows through the valve 468. As the water flow to the valve 468 increases, the flexible members 480 flex outwardly so as to facilitate the predetermined outflow velocity of the water received from the water pump.

Now in reference to FIGS. 14A-14D, a pool jet fitting 514 can be configured as a pop-up nozzle that is configured to clean a wall, such as the side wall or floor of the pool. The pool jet fitting 514 may be configured such that the flow of water through the pool jet fitting 514 is directed toward or at least along the wall of the pool to thereby force debris that is near the wall of the pool toward the drain and/or filter so as to automatically clean the wall, and/or to keep the debris in suspension so as to facilitate filtering. As shown in FIG. 1B, the pool jet fitting 514 can be mounted to the floor of the pool, though it should be appreciated, the pool jet fitting 514 can be mounted to the side wall of the pool, as desired.

Figure 14B:
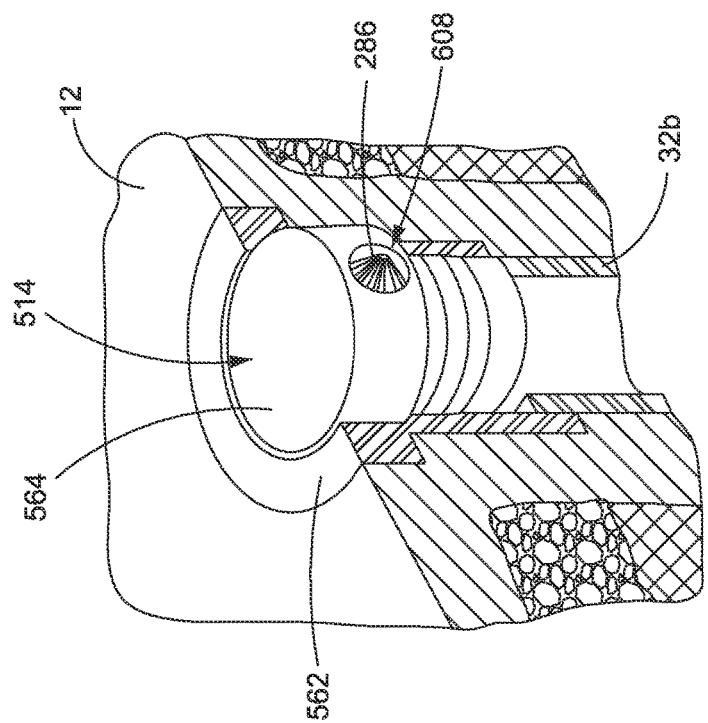
FIG. 14B is a perspective view of the pool jet fitting of FIG. 14A mounted to the floor of a pool.
Figure 14A:
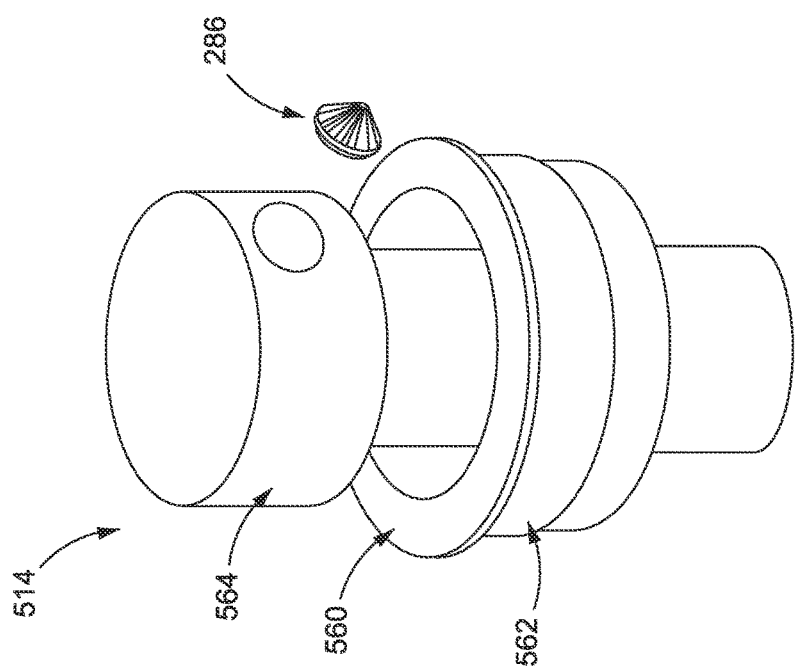
FIG. 14A is a perspective view of a pool jet fitting in accordance with another embodiment, the pool jet fitting configured as a pop up nozzle.

As shown in FIGS. 14A and 14B, the pool jet fitting 514 can be configured to be mounted to the floor of the pool 12 and/or to the side wall of the pool 12 as desired. The pool jet fitting 514 is configured to self-adjust so as to maintain adequate outflow velocity of the water flow whether the water pump 28 is operating at high speeds or at low speeds. As shown in FIG. 14A, the pool jet fitting 514 includes a housing 560 having a mounting portion 562 and a movable portion 564 that is moveable relative to the mounting portion 562 between a closed position and an open position. The pool jet fitting 514 further includes a valve such as valve 286 coupled to the housing 560, such as to the moveable portion 562 as illustrated. The valve 286 is configured to automatically adjust in response to a change in pump output from the second flow rate to the first flow rate to facilitate an outflow velocity of the water from the pool jet fitting 514 that adequately cleans the desired wall of the pool and/or urges the moveable portion 564 to its open position. It should be appreciated, that the pool jet fitting 514 can include any automatically adjusting valve as desired, such as any of valves 68, 368, or 468, for example.

As shown in FIG. 14A, the mounting portion 562 of the housing 560 is configured to be mounted to the floor or side wall of the pool and is coupled to the piping 32b. The mounting portion 562 includes a mounting body 598 and a bore 600 that extends through the body 598 along a first direction and is configured to be coaxial or otherwise in line with the piping 32b when the housing 560 is mounted to the floor or side wall and coupled to the piping.

Figure 14D:
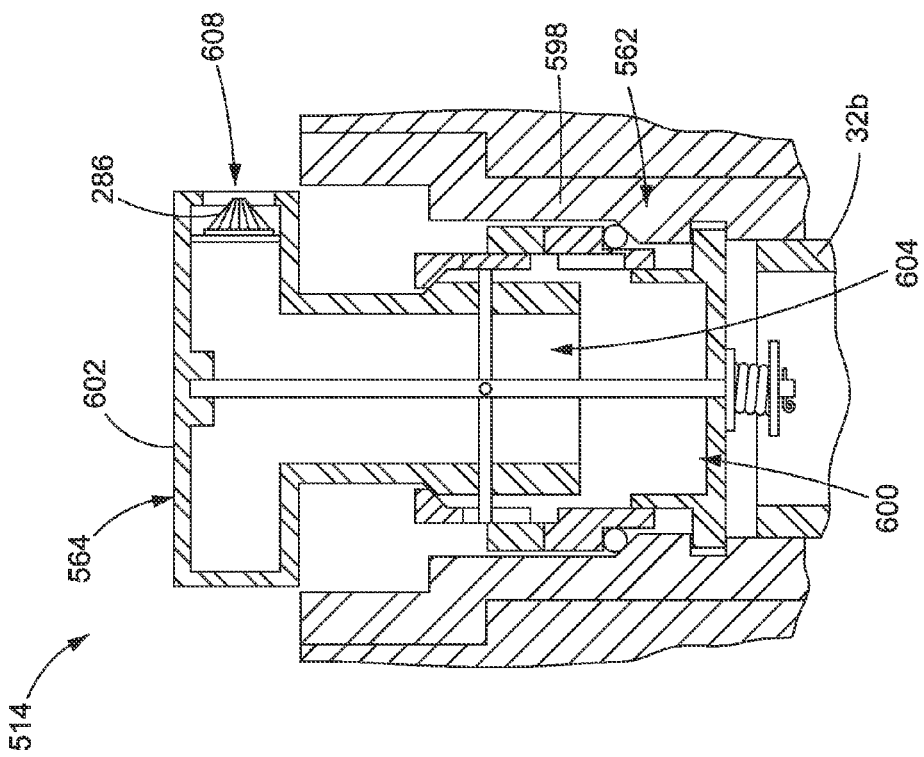
FIG. 14D is a cross-sectional view of the pool jet fitting of FIG. 14A in an open position.
Figure 14C:
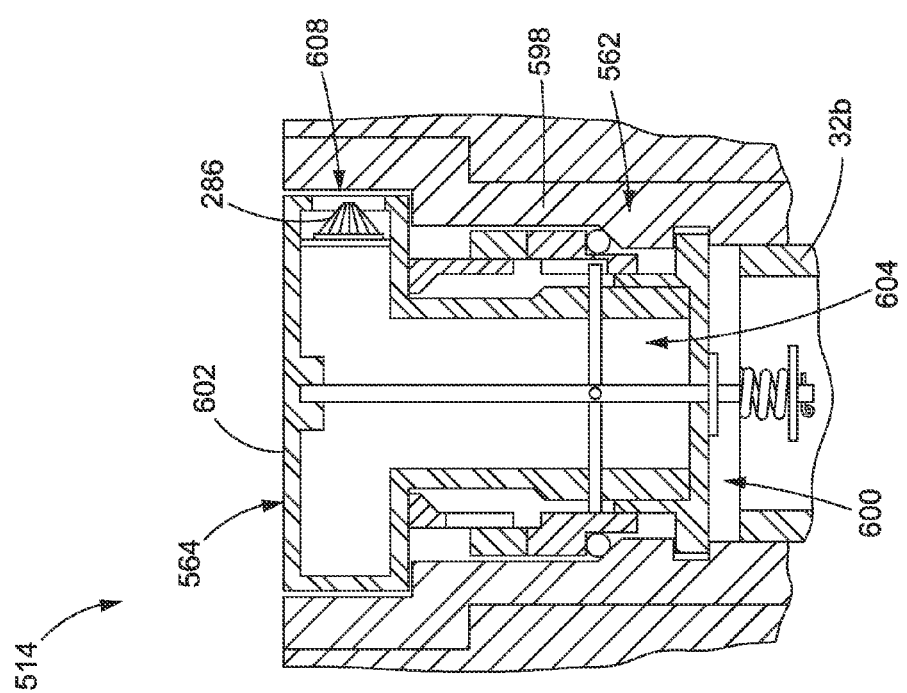
FIG. 14C is a cross-sectional view of the pool jet fitting of FIG. 14A in a closed position.

As shown in FIGS. 14C and 14D, the moveable portion 564 is moveable within the bore 600 of the mounting portion 562. The moveable portion 564 includes a moveable body 602 and a bore 604 that extends through the body 602 such that the bore 604 is substantially coaxial with the bore 600 of the stationary portion 562. The moveable portion 564 further includes a throughway 608 that extends through an upper end of the body 602 along a second direction that is perpendicular to the first direction and into the bore 604. Water flow that is received from the pump will flow through the bore 600, into the bore 604, and out through the throughway 608.

The valve 286 can be positioned within the bore 604 such that the valve 286 is in communication with the throughway 608. Therefore, the water flow will flow through the valve 286 as the water flow exits the fitting 514. Because the valve 286 has an adjustable opening 288, the outflow velocity of the water flow from the fitting 514 will be maintained within a desired range whether the pump is operating at high speeds or at low speeds.

In operation, the moveable portion 564 will initially be in a closed position as shown in FIG. 14C. At a desired time, water flow will be directed to the jet fitting 514 thereby causing the moveable portion 564 to move to the open position such that the throughway 608 is exposed within the pool. The water flow will exit the throughway 608 and cause debris on the floor or side wall of the pool to move toward the drain and/or filter, and or cause the debris to be suspended so as to facilitate filtering. Because the water flow travels through the valve 286, the moveable portion 564 will move to the open position even when the pump is operating at low speeds. Moreover, because the water flow travels through the valve 286, the outflow velocity of the water flow through the jet fitting 514 will be adequate enough to clean the pool as described even when the pump is operating at low speeds. It should be appreciated, that the valve 286 can be incorporated into any pool jet fitting that is configured as a pop-up nozzle. Therefore, it should be appreciated that the housing 560 can have any configuration as desired. For example, the bores 600 and 604 can be cylindrically shaped or alternatively shaped.

It should be appreciated that while the pool filter system 10 has been described as utilizing a variable speed water pump 28, the pool filter system 10 may utilize a single speed water pump 28. For example, because in certain cases the piping used to operatively couple the pool jet fittings 14 and 514 to the water pump 28 vary with respect to each pool jet fitting 14 and 514, the amount of or flow of water from the water pump 28 may vary with respect to each pool jet fitting 14 and 514. Therefore, by using the pool jet fittings 14 and/or 514 that include valves with adjustable openings, the outflow velocity from each pool jet fitting 14 and 514 may be substantially similar or at least within a desired range. Moreover, it should be appreciated that every pool jet fitting of the system 10 does not have to be a pool jet fitting 14 or 514 having an adjustable opening. Therefore, the pool filter system 10 may include some pool jet fittings 14 and 514 having an adjustable opening, and at least one non-adjustable pool jet fitting having a fixed opening.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes can be made without departing from the scope and spirit of the invention as defined by the appended claims. Furthermore, any features of one described embodiment can be applicable to the other embodiments described herein.

What is claimed:

1. A pool jet fitting configured to direct flow of water from a water pump, the pool jet fitting comprising:
a housing having:
a mounting portion, and
a movable portion movably coupled to the mounting portion such that the movable portion is movable relative to the mounting portion between a closed position and an open position; and
a valve coupled to the movable portion, the valve configured to receive the flow of water from the water pump when the valve is disposed in line with the water pump, the valve including an input end and an output end spaced from the input end in a first direction, the valve including a valve body, a plurality of flexible members that extend from the valve body and that converge toward a central axis, and an adjustable opening disposed at the output end, each flexible member including a proximal end disposed at the valve body, and a distal end opposed to the proximal end, each distal end being spaced apart from the central axis along a second direction that is perpendicular to the central axis so as to define the adjustable opening, the adjustable opening defining a dimension that extends along the second direction, and an entirety of the adjustable opening is unobstructed so as to permit water to flow through the valve,
wherein when the movable portion is in the open position and water is flowing into the valve, water impinging the plurality of flexible members increases the dimension of the adjustable opening from a first dimension to a second dimension that is greater than the first dimension so as to maintain a predetermined outflow velocity of the water as a flow rate of the flow of water from the water pump changes.

2. The pool jet fitting according to claim 1, wherein the housing includes a housing body, a bore that extends through the housing body, and the movable portion is movable relative to the mounting portion between a closed position and an open position.

3. The pool jet fitting according to claim 2, wherein the movable portion includes a body and a bore that extends through the body along a first direction, and a throughway that extends through the body along a second direction that is perpendicular to the first direction such that the through way is in communication with the bore.

4. The pool jet fitting according to claim 3, wherein the valve is in communication with the throughway such that an outflow of the water through the valve travels through the throughway.

5. The pool jet fitting according to claim 1, wherein the valve includes a plurality of extendable sections, each extendable section being coupled to a respective pair of adjacent flexible members of the plurality of flexible members.

6. The pool jet fitting according to claim 5, wherein the plurality of flexible members and the plurality of extendable sections are integrally formed as a monolithic unit.

7. The pool jet fitting according to claim 6, wherein the plurality of flexible members and the plurality of extendable sections are made from a rubber.

8. The pool jet fitting according to claim 7, wherein the adjustable opening is initially star shaped and is configured to expand to be substantially circular shaped.

9. The pool jet fitting according to claim 1, wherein the mounting portion includes a mounting body and a first bore that extends through the mounting body along a first axis;
wherein the movable portion includes a throughway that extends along a second axis that is perpendicular to the first axis,
wherein the valve is positioned within a second bore such that the valve is in communication with the throughway,
wherein when the movable portion is in the open position the throughway is exposed.

10. The pool jet fitting according to claim 9, wherein the movable portion includes:
a movable body and the second bore, which extends through the movable body along the first axis such that the second bore is substantially coaxial with the first bore of the mounting portion,
wherein the throughway extends through an upper end of the movable body along the second axis.

11. The pool jet fitting according to claim 1, wherein the pool jet fitting is a pop-up nozzle.

* * * * *